United States Patent [19]

Clark

[11] Patent Number: 4,632,792

[45] Date of Patent: Dec. 30, 1986

[54] METHOD OF MANUFACTURING FOAM INSULATED TANK

[75] Inventor: Keith R. Clark, Montgomery, Ala.

[73] Assignee: Rheem Manufacturing Company, Montgomery, Ala.

[21] Appl. No.: 705,226

[22] Filed: Feb. 25, 1985

[51] Int. Cl.⁴ .......... B28B 7/30; B29C 39/10; B29C 39/26; B29C 67/22

[52] U.S. Cl. ................. 264/45.2; 264/46.5; 264/46.6; 264/46.9; 264/314

[58] Field of Search ............ 264/45.2, 46.6, 46.9, 264/46.5, 314

[56] References Cited

U.S. PATENT DOCUMENTS

| | | | |
|---|---|---|---|
| 3,222,843 | 12/1965 | Schneider | 264/45.2 X |
| 3,310,615 | 3/1967 | Bender | 264/46.6 |
| 3,313,020 | 4/1967 | Krauskopf | 264/45.2 X |
| 3,357,142 | 12/1967 | Furrer et al. | 264/46.6 X |
| 4,372,028 | 2/1983 | Clark et al. | 264/45.2 X |
| 4,447,377 | 5/1984 | Denton | 264/45.2 |
| 4,477,399 | 10/1984 | Tilton | 264/45.2 |

FOREIGN PATENT DOCUMENTS 2084919  4/1982  United Kingdom ........... 264/45.2

*Primary Examiner*—Philip Anderson
*Attorney, Agent, or Firm*—Allegretti, Newitt, Witcoff & McAndrews, Ltd.

[57] ABSTRACT

A method of manufacturing a foam insulated water heater of the type having an inner tank, a layer of insulating foam material surrounding the inner tank and an outer protective shell includes, in one embodiment, the steps of (1) forming a flexible, expandable bag in a configuration which may be placed between the tank and shell, (2) attaching the flexible bag between the tank and shell, (3) filling the bag with a foam material which expands, and (4) continuing to fill the bag so that foam material expands through relief openings in the bag to fill the remainder of the space between the tank and the shell.

6 Claims, 3 Drawing Figures

U.S. Patent     Dec. 30, 1986     4,632,792
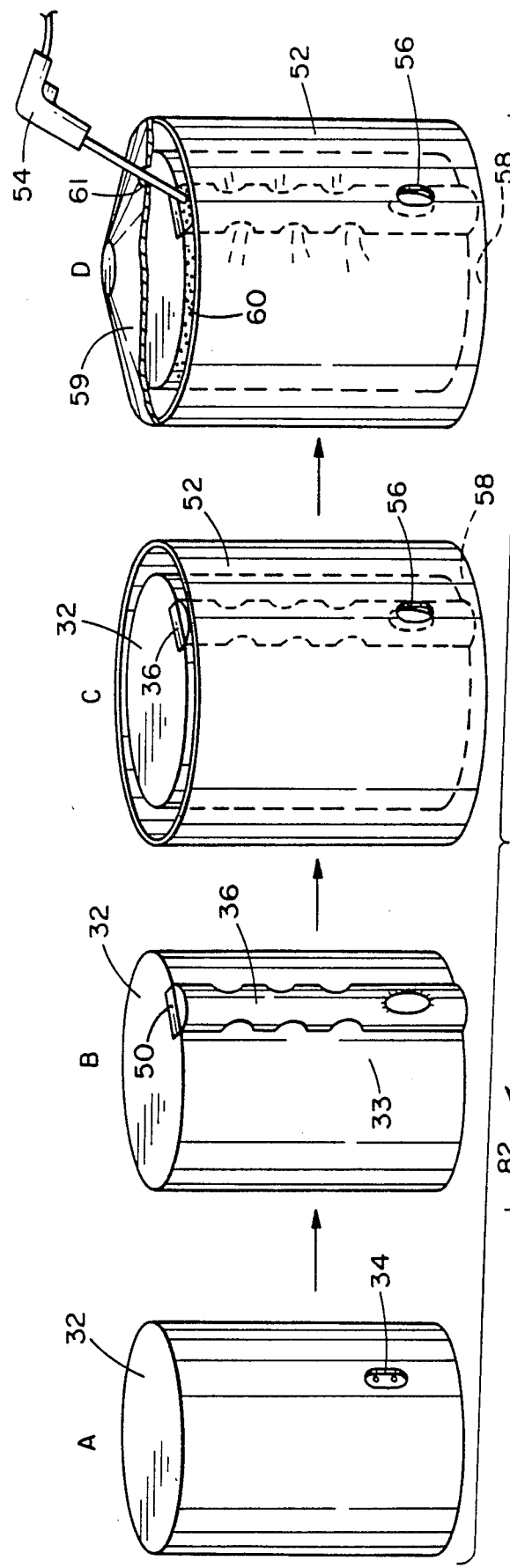
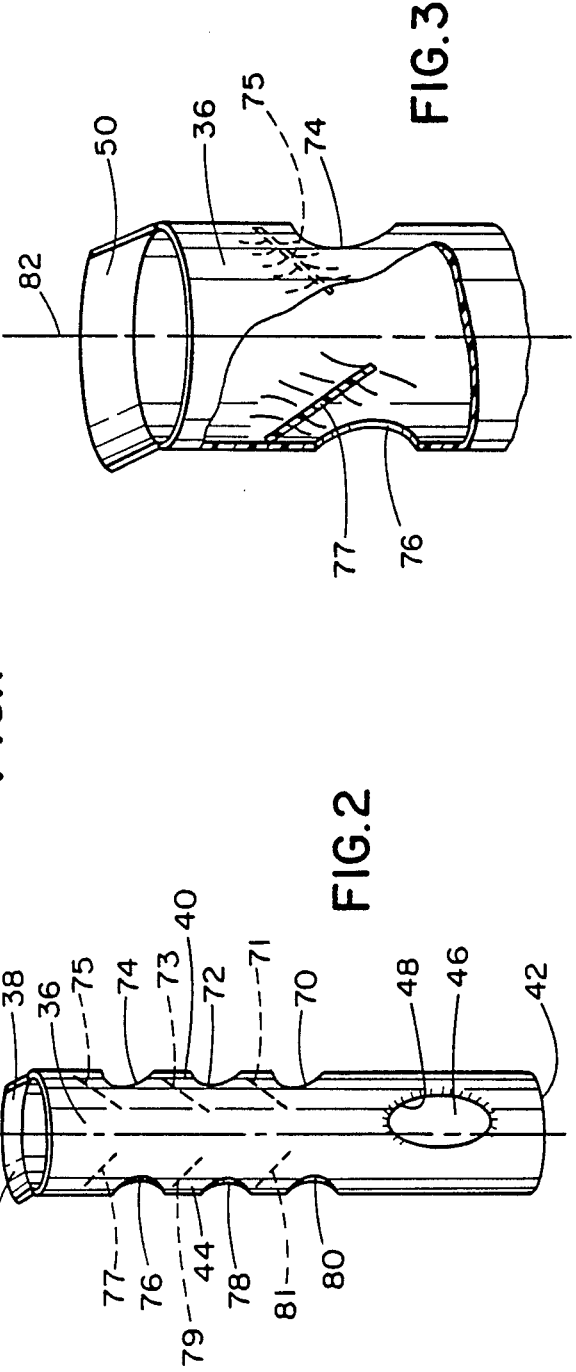

METHOD OF MANUFACTURING FOAM INSULATED TANK

BACKGROUND OF THE INVENTION

This invention relates to an improved method for the manufacture of insulated containers, particularly water heaters.

Electric and gas water heaters are generally comprised of a glass-lined, metal tank usually in the form of a cylinder which is surrounded by an insulating material retained about the tank by means of a protective, outer, sheet metal shell. In gas models, a burner compartment is normally located below the tank within the protective sheet metal shell. In electric models, a heating element normally projects through a side wall of the tank.

In order to improve the efficiency of such water heaters, it is desirable to provide external insulation for the tanks between the tank and the outer shell. Heretofore Fiberglas insulation has proven to be an excellent insulating material. More recently, expanded urethane foam has been utilized as the insulating material surrounding a water heater tank.

One of the problems associated with such a water heater assembly, particularly one having urethane foam as the insulating material, has been the method by which the foam material is formed about the tank. Generally the foam is injected as a liquid into the annular space between the inner tank and outer shell. However, it is necessary to use a core piece or other mold forming device within the space between the inner tank and outer protective shell to retain the foam within a desired region. For example, in an electric model the heating rod and controls are attached to the side wall of the tank and cannot be covered with foam.

One way of preventing foam from covering or forming over the controls has been to pack the region around the controls with Fiberglas insulation material. The Fiberglas insulation material then serves as a barrier during the foam molding operation.

Another procedure has been adopted by State Industries, Inc. of Ashland City, Tenn. The State Industries procedure calls for forming a flexible plastic bag with an open top, closed sides and a closed bottom edge. The bag then attaches to and partially encircles the inner tank. Expandable urethane foam is next injected into the bag causing the bag to expand and fill the space between the inner tank and the outer shell of the heater. In practice, the bag extends only partially around the circumference of the tank thus leaving a space or void in the region between the inner tank and outer shell defined by the opposite ends of the bag. Controls, inlets, outlets and the like are positioned in the void region, and the spaces between the controls are appropriately packed with a Fiberglas insulation material.

Another procedure is described in U.S. Pat. No. 4,372,028 issued Feb. 8, 1983 for a Method of Manufacturing Foam Insulated Tank. In that patent, the use of a small flexible bag to define the control space and the boundary for flow of foam material is disclosed. That invention permits utilization of expandable foam over substantially the entire outside surface area of a water heater tank. The method insures accurate and easily reproducible positioning of voids or spaces in the insulation through which controls, inlets, outlets and the like may be affixed to the tank. The method also eliminates usage of a large plastic bag from the manufacturing process and substitutes usage of a smaller, less expensive bag. As a result, undesired folds which may form in the large bag are avoided. Also, the insulating capability of the foam is enhanced since the foam will bond directly to the walls of the container and will not be retained in an air permeable bag. U.S. Pat. No. 4,372,028 is incorporated herewith by reference.

The present invention is an improvement of the subject matter of U.S. Pat. No. 4,372,028 and is especially useful in the manufacture of electric water heaters. The present invention eliminates the need for a secondary, separate injection of foam material as described in U.S. Pat. No. 4,372,028. Additionally, there is less leakage of foam material as well as less possibility for distortion of the flexible bag during the manufacturing process.

Thus, it is an object of the invention to provide an improved method of manufacturing a multiple layer container of the type having an inner wall, an intermediate insulating layer and an outer protective wall.

A further object of the present invention is to provide a method of manufacturing a water heater tank having an inner metal tank, an intermediate layer of expanded urethane foam material and an outer protective shell or cover.

Still another object of the present invention is to provide a method of manufacturing a multiple layer container having improved insulating features, improved economy of manufacture, and which does not require significant capital investment in new equipment.

Another object of the invention is to eliminate the necessity of using a large, tank encompassing bag to receive foam and surround an inner metal tank in an assembly which incorporates an inner tank, an insulating layer on the tank and an outer shell over the insulation layer.

A further object of the invention is to provide a method of manufacturing a foam insulated tank assembly having a single foam injection step.

These and other objects advantages and features of the invention will be set forth in the detailed description which follows.

SUMMARY OF THE INVENTION

Briefly, the present invention comprises a method of manufacturing a multiple layer container of the type having an inner wall, an intermediate layer of expanded foam material and an outer wall. The inner and outer walls serve to retain the expanded foam material during the manufacturing process. The method comprises the steps of (1) forming a flexible, expandable bag in a configuration which may be attached to the inner wall, (2) positioning the flexible bag in the desired position on the inner wall, (3) positioning the outer wall in spaced relation and about the flexible bag and inner wall to define a space between the inner wall and outer wall, (4) filling the flexible bag, which has relief openings, with expandable foam material; and (5) expanding the flexible bag contents to form a barrier between the inner and outer walls while filling the remaining space between the walls with expandable foam flowing through relief openings in the bag. The sequence of the aforesaid steps may be altered. The configuration of the flexible bag and the position and manner of attachment to the tank may also be varied to define different sections of the mold wall. The flexible bag is configured to define voids or spaces in the final foam layer of the multiple layer container.

BRIEF DESCRIPTION OF THE DRAWING

In the detailed description which follows, reference will be made to the drawing comprised of the following figures:

FIG. 1, parts A through D, is a schematic representation of the sequential steps of an embodiment of the manufacturing process of the present invention;

FIG. 2 is a perspective view of the preferred embodiment of the flexible bag used in the process; and FIG. 3 is an enlarged perspective view of the flexible bag of FIG. 2.

DESCRIPTION OF THE PREFERRED EMBODIMENT

In the figures, FIG. 1, parts A-D relate, in general, to the method of manufacture of an electric water heater utilizing the method of the present invention. It is, of course, possible to utilize the techniques and method of the present invention for manufacture of other devices in addition to water heaters. The invention thus relates to the method of manufacture of any multi-layered container wherein the intermediate layer is comprised of expanded foam, for example expanded urethane foam, and the other or surrounding layers are comprised of walls which act as a mold form, at least in part, for the expanded foam material. Thus, inner and the outer walls serve only as mold forms in forming the opposite side faces of the insulating layer. The invention relates particularly to the method for forming voids or passages through the insulating layer between the walls for receipt of controls, inlets and outlets, etc.

In general, a flexible bag, for example a polyethylene bag, which is sized and configured to fit in the space between the inner and outer walls, is provided with one or more sealed passages therethrough. The bag expands tightly against the inner and outer walls when filled with expandable foam material. Thus, the bag is positioned between the inner and outer walls, filled with foam and permitted to expand tightly against the inner and outer walls. The flexible and expandable bag can be configured so that voids or spaces will be defined by the bag between the walls. Importantly, in addition, the bag includes at least one relief opening through the bag to the region between the inner wall and outer wall for the flow of foam material from the bag into the space between the inner wall and outer wall or shell. Thus, it is possible to simply inject foam material into the flexible bag to fill the bag as well as the entire space between the walls. The provision of relief openings in the bag as well as diversion panels within the bag associated with the relief openings insures sequential filling of the bag by foam material followed by filling the space between the walls. Further details of these features are set forth with respect to the specific example of the invention discussed below.

Method of Manufacturing Electric Water Heater

FIG. 1, parts A-D illustrates application of the method of the present invention to the manufacture of a typical electric water heater tank assembly. As shown in FIG. 1A, a tank 32 is generally cylindrical in shape and has a closed top and bottom. A control panel 34 is defined in the side of the tank 32 projecting from surface 33. Panel 34 may comprise, for example, controls mounted on the wall surface 33 of the tank and projecting outward, as well as electric heating rod elements which project into the interior of the tank 32.

An expandable flexible bag 36, preferably of a polyethylene plastic material, is formed to receive expandable foam, for example, urethane foam. As shown in FIG. 2, bag 36 is formed as a tube by opposed flat sheets of plastic material which are heat sealed together along sealed edges 40, 42 and 44 to form the bag 36 with a top opening 38. A void or opening 46 is defined in the bag 36 by overlying cutouts in the sheets which are sealed along a circular or oblong sealed edge 48. In other words, the sheets of polyethylene or plastic material forming the bag 36 are sealed along the edge 48 to define opening 46. An optional support flap 50 is defined adjacent the top opening 38.

As depicted in FIG. 2 and FIG. 3, the bag 36 includes, in the embodiment shown, a series of six relief passages or openings 70, 72, 74, 76, 78, 80 in the side walls of bag 36. The relief passages 70, 72, 74, 76, 78, 80 are divided into opposite sets of three passages 70, 72, 74 and 76, 78, 80. Each set of passages 70, 72, 74 and 76, 78, 80 are positioned on opposite sides of bag 36, the lowest being generally above the initial liquid level of the injected foam material and preferably vertically above the void or opening 46 through bag 36. In this manner, when foam material is injected into bag 36, foam material will initially fill the bottom of bag 36, and expand in the region adjacent void 46 before spilling through passages 70, 72, 74, 76, 78, 80. As a result, the bag 36 will be held substantially rigid in position between tank 32 and an outer shell or wall 52 before foam material flows from bag 36. Also, the passages 70, 72, 74, 76, 78, 80 are preferably aligned and oriented so that they lead directly into the annular space between tank 32 and shell 52.

As depicted in FIG. 2, the bag 36 may include diversion shunts 71, 73, 75, 77, 79 and 81 associated with each or some of the relief openings 70, 72, 74, 76, 78 and 80, respectively. Diversion shunt 71 is exemplary of the structure and function of the diversion shunts. Shunt 71 is formed by heat sealing a sector of the bag 36, which is polyethylene or other bag material. The shunt 71 may thus be formed by sealing the sides of bag 36 together above opening 70 along a line which inclines downward from above opening 70 for a distance approximately equal to the diameter of opening 70. The downward inclination of shunt 71 is preferably 30° to 45° from horizontal through this angle may be varied to accommodate the foam material being used for example.

In review, the shunt 71 preferably has a straight line form when the bag 36 is filled. The shunt 71 is also preferably inclined slightly downward with respect to a vertical central axis 82 of the bag 36. In this manner, as the bag 36 is filled with foam material, the bag 36 will initially fill at the bottom. As the level of foam material increases due to the addition of foam material and the expansion thereof, foam material will be diverted, in part, by the shunt 71 through the associated opening or passage 70. By positioning the opening 70 as well as the shunt 71 above the void 46, the lower portion of the bag 36 will expand and hold the bag in position. Then as the bag fills, foam material will exude through the passages, as at 70, being diverted, in part, by the shunt 71. FIG. 3 is an enlarged cutaway section of the bag 36 illustrating the manner in which the shunt 71 is positioned relative to the passage 70 and also relative to vertical axis 82 associated with the bag 36 as the bag 36 is positioned on the outside surface 33 of tank 32.

As shown in FIG. 1B, the bag 36 is initially affixed to the side of the tank 32. For example, the optional flap 50 may be taped to the top of tank 32 in order to support the bag 36 on the outside surface 33 of the tank 32. The bag 36 is dimensioned to extend from the top to the bottom of the tank 32. Also, the void or opening 46 is positioned over the panel 34. Optionally, the bag 36 may be attached to the surface 33 of tank 32 or to the inner surface of the outer shell 52 by use of hot melt glue or another adhesive, for example.

FIG. 1C illustrates the next step in the manufacture of the assembly. First, outer shell 52 is positioned over the tank 32 and bag 36. Optionally, of course, if the bag 36 is attached to the shell 52, both fit over tank 32. Note that in an electric water heater, the shell 52 has approximately the same elevational dimension as the tank 32. This results because there is no requirement for a burner section below the tank 32. The shell 52 also includes an access port 56 which is placed in register with opening 46 and panel 34.

As depicted by FIG. 1D, subsequent to positioning the shell 52 with respect to the tank 32, an expandable foam material is injected into the bag 36 by means of injector mechanism 54. The foam material is then permitted to expand. In this manner the bag 36 impinges on the opposed surfaces of the tank 32 and shell 52 simultaneously along a narrow longitudinal strip defined by bag 36. The opening 46 is maintained in proper register with the panel 34 on the tank 32 and an opening 56 defined in the outer shell 52. Consequently, proper access can be maintained for inserting a heating element or other controls into the tank 32. Though only one bag 36 having a single opening 46 is described, it is possible to have multiple bags having any number of openings or without openings.

As also represented by FIG. 1D, the outer shell 52 connects to a lower end or bottom panel 58 that blocks foam material. This lower end 58 thus defines the bottom of a mold form which is adapted to receive expandable foam. A top cover of pan 59 fits over the top of shell 52 and includes an opening 61 for receipt of a foam injector mechanism 54. Alternatively, the foam material may be injected before positioning pan 59 on the shell 52.

As shown in FIG. 1D, the injector mechanism 54 is used to inject foam material into the annular space between the shell 52 and tank 32 by introduction through bag 36 and subsequent flow through relief openings 70, 72, 74, 76, 78, 80 as required. This foam will flow into bag 36 and then flows from bag 36, through the relief openings, eg. 70 as diverted by shunt 71, and about the tank 32. The foam will subsequently expand to form an insulating layer 60 partially depicted in FIG. 1D which totally surrounds the tank 32.

It can be seen that the application of the method of the present invention illustrated in FIG. 1 contemplates utilization of a flexible expandable bag to define, in part, the mold form in the space between a container or tank and an outer shell. Many variations of the described method are possible. Container size and shape may vary. Expandable bag size and position may vary. The number, size and position of relief passages or openings in the bag may vary. The shape, size and position of shunts in the bag may be varied. Thus, while there has been set forth a preferred embodiment of the invention, it is to be understood that the invention is to be limited only by the following claims and their equivalents.

What is claimed is:

1. A method of manufacturing a multiple layer water tank of the type including an inner wall, an intermediate layer of expanded foam material and an outer wall comprising the steps of:
    (a) forming a flexible, expandable bag in a configuration which may be affixed to the inner wall, said bag having an elongate shape defined by sides, a closed bottom end, and an open top end, said bag also having at least one relief opening in a side with a diversion shunt formed in the bag above the opening, intermediate the opening and the top end;
    (b) forming voids in the flexible bag by sealing a passage through the bag to define a passage through the final intermediate layer to thereby facilitate assembly connections through the outer wall and, insulating material and inner wall;
    (c) positioning the flexible bag on the inner wall to define at least a portion of a mold form between the inner wall and outer wall;
    (d) aligning the void of the flexible bag with a connection on the inner wall;
    (e) positioning the outer wall about the inner wall and flexible bag to define a space between the inner wall and outer wall, said space being generally annular and closed at the bottom between the inner and outer walls;
    (f) orienting an opening through the outer wall with the flexible bag void;
    (g) at least partially filling the flexible bag with an expandable foam material;
    (h) waiting for foam material in the flexible bag to expand and engaging the bag with the inner wall and the outer wall of the tank to thereby define, at least in part, a mold form in the space between the walls; and
    (i) further filling the flexible bag and diverting expandable foam material through the relief opening by means of the diversion shunt thereby filling the space between the walls while preventing foam material to fill the void.

2. The method of claim 1 wherein the foam material is an insulating foam material.

3. The method of claim 1 wherein said flexible bag comprises a longitudinal bag, said bag being installed parallel to the vertical axis of the tank with the open end of the bag upward.

4. The method of claim 1 including the step of providing a plurality of relief openings in the flexible bag with a diversion shunt associated with each opening.

5. The method of claim 1 including the step of providing a series of openings in vertical array in the sides of the expandable bag, and the further step of discharging material through the lower opening in the vertical array prior to discharge of material through the next succeeding opening in the vertical array.

6. The improved method of claim 5 including the step of providing a diversion shunt inclined with respect to a vertical axis of the expandable bag when the bag is positioned between the walls and further including the step of directing material to the bottom of the bag by the diversion shunt positioned over the opening in the bag and thence out through the opening as the material fills the bag from the bottom upward.

* * * * *